UNITED STATES PATENT OFFICE.

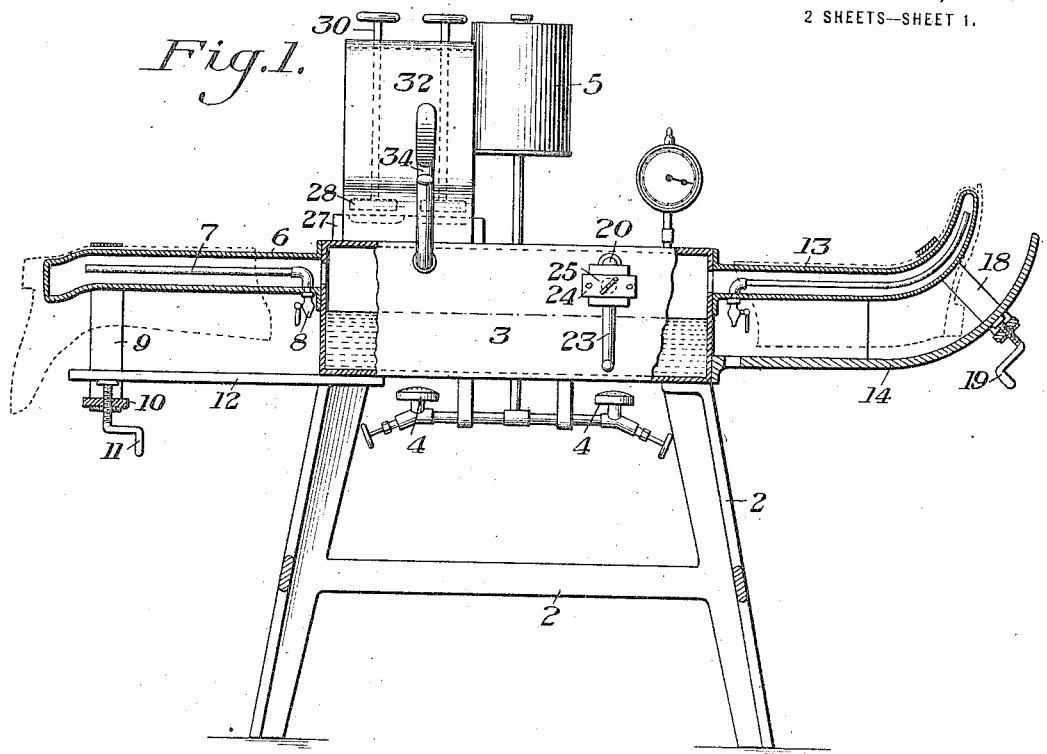
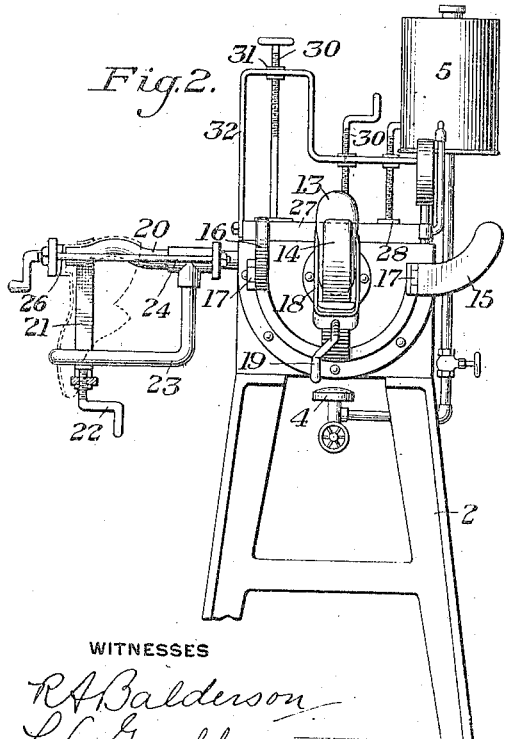
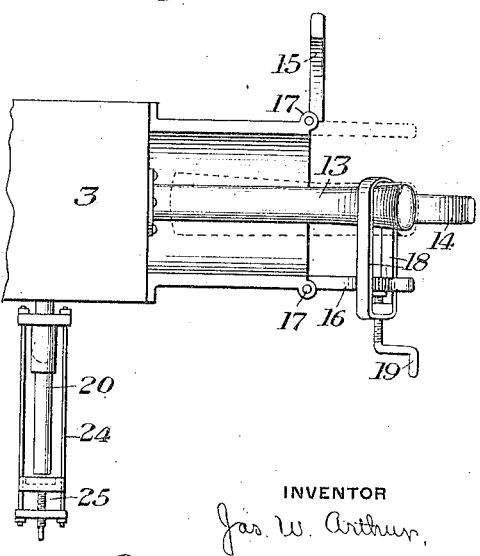

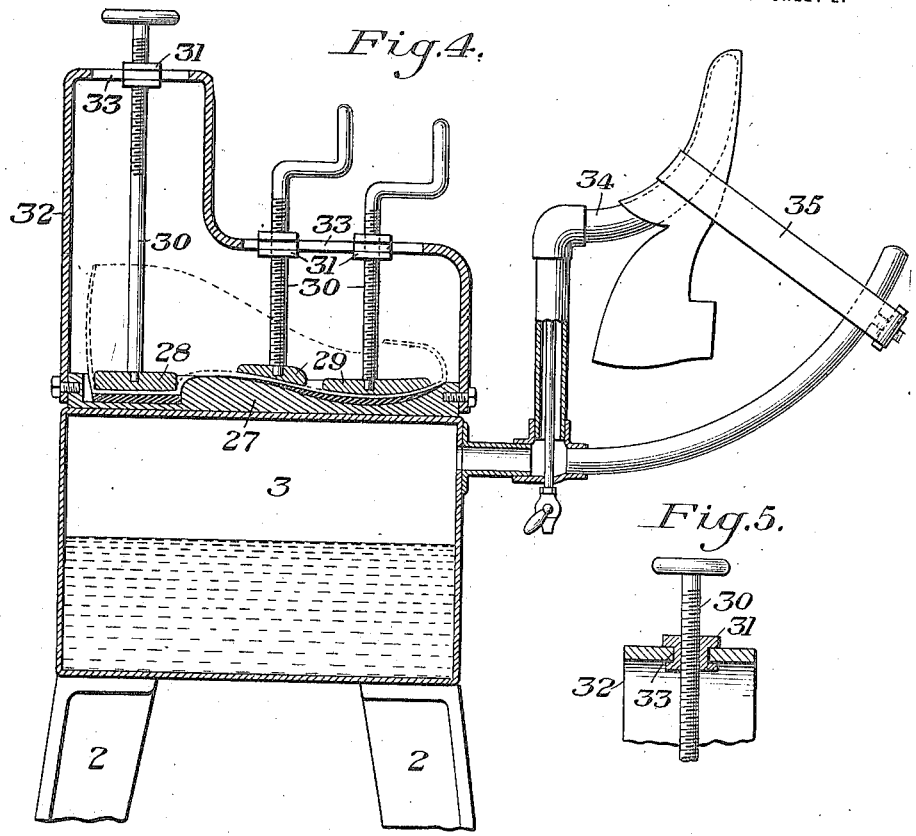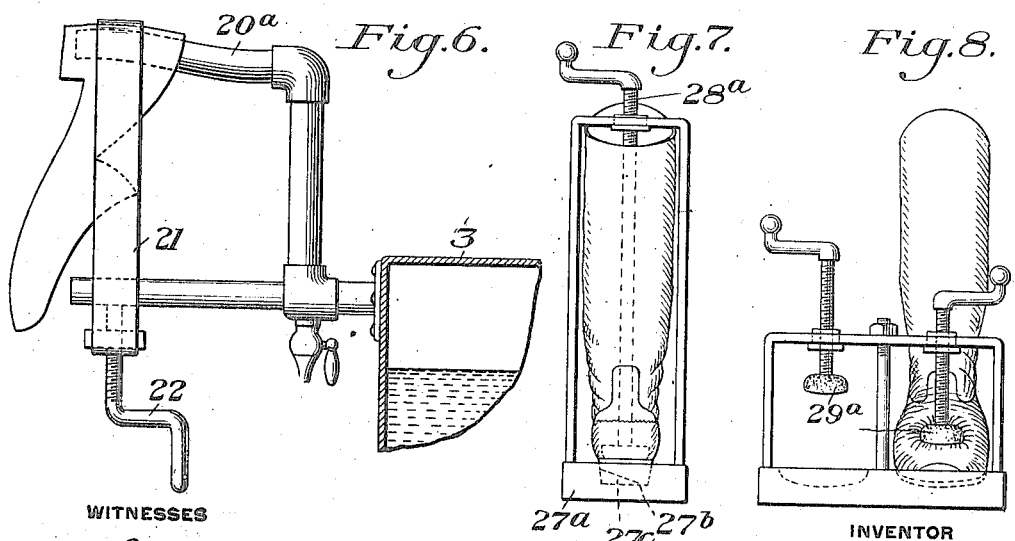

JAMES W. ARTHUR, OF WARREN, OHIO.

VULCANIZING APPARATUS.

1,157,751. Specification of Letters Patent. Patented Oct. 26, 1915.

Application filed April 7, 1913. Serial No. 759,486.

*To all whom it may concern:*

Be it known that I, JAMES W. ARTHUR, a citizen of the United States, residing at Warren, Trumbull county, Ohio, have invented a new and useful Improvement in Vulcanizing Apparatus, of which the following is a full, clear, and exact description, reference being had to the accompanying drawings, forming part of this specification, in which—

Figure 1 is a view partly in side elevation and partly in vertical section of one form of apparatus embodying my invention; Fig. 2 is an end view of the same; Fig. 3 is a plan view of a portion of the machine; Fig. 4 is a transverse section; Fig. 5 is a detail sectional view; Fig. 6 is a detail view showing a modification of a portion of the apparatus; and Figs. 7 and 8 are detail views showing different forms of top attachments for the boiler.

My invention has relation to a vulcanizing apparatus, and more particularly to apparatus for use in patching and repairing rubber boots and shoes.

The object of my invention is to provide apparatus of this character, which is simple and convenient in its construction; by means of which a piece or patch may be applied to and vulcanized to any portion of a rubber boot or shoe; and to provide simple and effective means for obtaining the necessary heat and pressure for complete vulcanization.

The nature of my invention will be best understood by reference to the accompanying drawings, in which I have shown a preferred embodiment, and which will now be described, it being premised that various changes can be made in the details of construction and arrangement of the parts without departing from the spirit and scope of my invention as defined in the appended claims.

In these drawings, the numeral 2 designates a supporting stand of any suitable character and having mounted thereon a boiler 3 for the generation of steam to supply the necessary heat for the vulcanizing operations. This boiler may be heated by any suitable arrangement of burners, such as indicated at 4 and supplied either by gas or gasolene. In the machine illustrated I have shown the burners as adapted to be supplied with gasolene from a tank 5.

In accordance with my invention, I provide a boiler 3 with a plurality of projecting hollow supports for the articles to be vulcanized, each of these supports having means for conveying steam therein; and also having means in connection therewith for applying the necessary pressure to the article on the supports. The different supports are arranged to facilitate the operations upon different parts of a boot or shoe.

For vulcanizing pieces on the rear portion of a boot, I provide the projecting hollow support or horn 6, which communicates at its inner end with the interior of the boiler 3. Extending within this horn to a point near the outer end thereof is an escape pipe 7 for the steam, having a pet cock 8 at its inner end which communicates with the atmosphere. The pipe 7 and pet-cock 8 also provide simple and effective means whereby the heating of the horn may be localized, by controlling the escape of the air trapped within the horn. Thus, in some instances it is desirable to localize the heat and confine it to a portion of the horn some distance back from the outer end thereof. This can be done, after the work is in place on the horn, by manipulating the pet-cock 8 so as to leave a considerable body of air entrapped within the horn. The boot to be repaired is placed upon this support or horn in the manner shown in dotted lines in Fig. 1, and the patch is held thereon by means of clamping devices. These devices are shown as consisting of a flexible strap 9 arranged to be passed over the horn in the manner shown and having its ends attached to a nut 10. The necessary pressure is applied to this strap by means of a handled screw 11 having a threaded bearing in the nut and a fixed bearing at its end against a portion 12 of the frame. At the opposite end of the machine is a hollow horn or projection 13 having an upwardly curved end portion adapted to fit within the toe or instep portion of a boot, as shown in dotted lines. Below this horn or support 13 is a fixed frame member 14, and at either side thereof is a frame member 15 or 16, each of which has an end portion hinged at 17.

18 is a clamping device similar to that before described. In working upon the upper portion of the toe of the boot, this clamping device is arranged as shown in Fig. 1, its handled clamping screw 19 bearing against the lower projection 14 of the frame. If it is desired to apply a patch to the side portions of the boot, the clamping device will be applied to one or the other of the projections 15 or 16 in the manner shown in Fig. 3, the hinged portion of the projection at the opposite side being turned back as indicated in full lines in Fig. 3.

Projecting from one side of the boiler and communicating with the interior thereof, is a hollow support or horn 20, particularly adapted for work on light or low cut rubber shoes. The shoe may be placed in various positions on this horn, one of such positions being illustrated in dotted lines in Fig. 2. It is provided with a clamping device 21 similar to those before described, the handled clamping screw 22 thereof having a bearing against a fixed arm 23. I may also provide the support 20 with the yoke 24 carrying a screw clamp 25 by means of which a heel piece 26 may be clamped against and vulcanized to the heel of the shoe. In most instances, however, in vulcanizing heel and sole pieces I prefer to provide separate means, such as best shown in Fig. 4. This arrangement consists of a plate 27 removably seated on the top of the boiler 3 and having suitable depressions therein for the heels and soles of one or more boots or shoes. For obtaining the necessary pressure, I provide the clamping members 28 and 29, actuated by the screws 30. These screws preferably have their bearing in nuts 31 carried by the hollow frame or casing portion 32, which is secured to the plate 27 to be removable therewith. The nuts 31 are preferably adjustable in slots 33 so as to enable the clamping members to be brought into the most effective positions. By the provision of the removable plate 27, the pieces to be vulcanized can be properly placed in the plate 27 while the latter is cold and the clamps applied thereto, after which the device can be placed on the boiler. This is a feature of great practical value, since the work can be accurately fitted and placed while the parts are cold, thus greatly facilitating the work. The parts can also be cooled before the work is removed. In Fig. 7 I have shown a form of this top attachment in which the plate 27ª has a cavity 27ᵇ which is shaped to receive and apply a wedge-shaped patch 27ᶜ to a worn boot-heel. In this case the clamp 28ª is adapted to pass down within the boot-leg. Fig. 8 illustrates another form of top-attachment for placing soles on boots. In this form the clamps have padded buttons or clamping members 29ª which press upon the top of the boot toes. I may also provide the heater with a horn or support 34, at the opposite side thereof from the horn or support 20, this horn having an upwardly curved portion adapted to hold a shoe while vulcanizing the patch on the front part of the upper. 35 designates the clamping band for this horn or support.

Fig. 6 shows a modification of the horn shown at 20 in Fig. 2. It differs from Fig. 2 only in the shape of the horn 20ª, which extends upwardly from its connection with the heater.

It will be apparent from the foregoing that my invention provides vulcanizing apparatus which is simple and inexpensive in character, and by means of which the vulcanizing may be done upon any desired part of a boot or shoe. It will be obvious that the heater may be provided with a variety of different forms of horn or support other than the particular forms which I have illustrated, thereby adapting the machine to a still wider character of work. It will also be obvious that instead of generating the steam directly within the steam chamber of the apparatus, steam may be supplied thereto in any suitable manner.

What I claim is:—

1. Vulcanizing apparatus of the character described, comprising a boiler for generating steam, a hollow work supporting member attached to said boiler and projecting therefrom and communicating with the steam space thereof, and a heat regulating device for said member comprising an escape pipe extending within the member and having a controlling valve exteriorly of the member; substantially as described.

2. Vulcanizing apparatus of the character described, comprising a boiler for generating steam, a hollow work supporting member attached to a steam chamber of said boiler and communicating with the steam space thereof, the outer end portion of the member being curved in a vertical direction and shaped to fit within a portion of a boot or shoe, means for clamping the work on the support, and means for controlling the heating of the member; substantially as described.

3. Vulcanizing apparatus of the character described, comprising a boiler for generating steam, a hollow work supporting member attached to a steam chamber of said boiler and projecting therefrom, said member being shaped to fit within and support a boot or shoe and means for localizing the heating of the member; substantially as described.

4. Vulcanizing apparatus comprising a boiler for generating steam, a plurality of hollow horns or supporting members attached to a steam chamber of the boiler and projecting therefrom, and communicating with the interior thereof, said horns or supporting members having differently curved end portions to adapt them to fit within different portions of a boot or shoe, the boiler having a flat upper surface, and a removable work holding and vulcanizing form adapted to be supported on said flat upper surface.

5. Vulcanizing apparatus of the character described, comprising a steam chamber, a hollow work supporting horn attached to said chamber and projecting therefrom and communicating therewith, said horn being adapted to fit within the article to be vulcanized, and a heat-regulating device for said member comprising an escape pipe leading to the forward end portion of the horn and having a control valve near the opposite end of the horn together with means for clamping the work on the horn; substantially as described.

6. Vulcanizing apparatus of the character described, comprising a heater having a top plate and a heating plate adapted to rest directly upon and be supported and heated by contact with said top plate, said heating plate being capable of being entirely removed from the heater and having an upper work-supporting and shaping surface, together with a vertically movable clamping device mounted upon and removable with said heating plate and arranged to force the work downwardly against the plate, substantially as described.

7. Vulcanizing apparatus of the character described, comprising a heater having a top plate and a heating plate adapted to rest directly upon and be supported and heated by contact with said top plate, said heating plate being of solid metal and having an upper work-supporting and shaping surface, together with means carried by said heating plate for clamping the work thereto, substantially as described.

In testimony whereof, I have hereunto set my hand.

JAMES W. ARTHUR.

Witnesses:
 GEO. BUNTING,
 C. W. HOLCOMB.

Copies of this patent may be obtained for five cents each, by addressing the "Commissioner of Patents, Washington, D. C."